(12) United States Patent
Hiraoka

(10) Patent No.: US 8,845,779 B2
(45) Date of Patent: Sep. 30, 2014

(54) PROCESS FOR PRODUCING MOLTEN IRON

(75) Inventor: Teruyoshi Hiraoka, Kobe (JP)

(73) Assignee: ISTC Co., Ltd., Kobe-shi (JP)

( * ) Notice: Subject to any disclaimer, the term of this patent is extended or adjusted under 35 U.S.C. 154(b) by 304 days.

(21) Appl. No.: 12/737,973

(22) PCT Filed: Sep. 7, 2009

(86) PCT No.: PCT/JP2009/065590
§ 371 (c)(1),
(2), (4) Date: Mar. 4, 2011

(87) PCT Pub. No.: WO2010/032642
PCT Pub. Date: Mar. 25, 2010

(65) Prior Publication Data
US 2011/0154951 A1    Jun. 30, 2011

(30) Foreign Application Priority Data

Sep. 16, 2008  (JP) .................................. 2008-237163
May 27, 2009  (JP) ................................ 2009-128008

(51) Int. Cl.
*C22B 9/00*  (2006.01)

(52) U.S. Cl.
USPC .................... 75/507; 75/392; 75/414; 75/433

(58) Field of Classification Search
USPC ......................................................... 75/507
See application file for complete search history.

(56) References Cited

U.S. PATENT DOCUMENTS

| | | |
|---|---|---|
| 4,881,972 A | 11/1989 | Weber et al. |
| 5,413,623 A | 5/1995 | Oonuki et al. |
| 5,639,293 A | 6/1997 | Bernard et al. |
| 5,902,374 A * | 5/1999 | Kitamura et al. ............... 75/508 |
| 6,017,380 A | 1/2000 | Kitamura et al. |
| 2006/0060028 A1 * | 3/2006 | Cameron et al. ............... 75/533 |

FOREIGN PATENT DOCUMENTS

| | | |
|---|---|---|
| AU | 625723 B2 | 9/1990 |
| CN | 1034759 A | 8/1989 |
| CN | 1035136 A | 8/1989 |
| CN | 1045129 A | 9/1990 |
| CN | 1123840 A | 6/1996 |

(Continued)

OTHER PUBLICATIONS

Machine translation of JP 2003194307, 2003.*

(Continued)

*Primary Examiner* — Rebecca Lee
(74) *Attorney, Agent, or Firm* — Edwards Wildman Palmer LLP

(57) ABSTRACT

The object of the present invention is to provide a process for producing molten iron through the efficient reduction of iron oxide having various chemical compositions and various shapes, or through the efficient melting of scrap iron or reduced iron having various shapes and various chemical compositions, the process being used in cases where the amount of iron necessary per furnace is not so large as in blast furnace processes. Specifically, the present invention provides a process for producing molten iron comprising the steps of: supplying carbon-containing molten iron to a holding container, heating the molten iron using heat of a combustion reaction of a gas mixture containing a fuel gas and a combustion-supporting gas, thereby storing the heat therein, and adding a carbon source and an iron-containing material that contains iron oxide and/or scrap iron to the heated and heat-stored molten iron, thereby converting the iron-containing material to molten iron.

8 Claims, 3 Drawing Sheets

(56) References Cited

FOREIGN PATENT DOCUMENTS

| CN | 1168157 A | 12/1997 |
| CN | 1345381 A | 4/2002 |
| EP | 1127171 B1 | 6/2003 |
| JP | 59-197512 A | 11/1984 |
| JP | 01-283312 A | 11/1989 |
| JP | 05-263120 A | 10/1993 |
| JP | 06-073431 A | 3/1994 |
| JP | 06-073433 A | 3/1994 |
| JP | 2003-194307 A | 7/2003 |
| WO | WO-2008/078933 A1 | 7/2008 |

OTHER PUBLICATIONS

Machine translation of JP 05263120, 1993.*

K. Iwasaki et al., "Integrated test plant work on smelting reduction iron-making process," International METEC Congress New Developments in Metallurgical Processing Dusseldorf, 1989, VII, pp. 1-15 and a cover page.

M. Kawakami et al., "The DIOS-process Flexible Compact and CleanIronmaking Process for the 21st Century," 52nd(II Congresso Internacional de Tecnologia Metalurgica e de Materiais) (1997) pp. 1556-1572 (renumbered pp. 1-18) and a cover page.

T. Kitagawa et al., "The DIOS process—the advanced smelting technology for the 21st century," International Conference on New Developments in Metallurgical Process Technology Duesseldorf (1999), pp. 42-49 and a cover page.

International Search Report dated Dec. 8, 2009, issued for PCT/JP2009/065590.

Office Action dated Sep. 21, 2012 for the corresponding Chinese Patent Application No. 200980136438.X and English translation thereof.

* cited by examiner

PROCESS FOR PRODUCING MOLTEN IRON

TECHNICAL FIELD

The present invention relates to a process for producing molten iron.

BACKGROUND ART

Generally, in the production of steel products, molten iron, which is used as a raw material of steel products, is produced in a stage prior to the final refinement for adjusting the chemical composition of steel products, and is subjected to purpose-specific refining, thereby obtaining the final product of steel material.

Examples of a starting material used in molten iron production include various iron-containing materials such as iron ore, iron oxide dust that is generated during refinement, reduced iron that is produced using iron ore as a starting material, scrap iron, etc. Basically, any iron-containing material can be used as a starting material of molten iron; however, in many cases, the kind of the starting material used and the production process employed depend on economic efficiency.

Although there are various molten iron production processes, from the viewpoint of the main starting material, blast furnace-LD converter processes in which iron ore is used as the main starting material are predominate in the world, followed by electric arc furnace processes in which scrap iron is used as the main starting material.

In a blast furnace process, carbon-saturated molten iron is obtained by using iron ore as the main starting material and coke as a reductant, and reducing the iron ore by blowing high-temperature heated air to it. However, the blast furnace process requires sintering equipment and a coke oven for pre-treating iron ore, which is the main starting material, and coal, which is a raw material of coke, which is used as a reductant, thus increasing capital-investment expenses. From a rational economic viewpoint, such a blast furnace process is said to be applicable only to a large-scale steel works (annual output of not less than 3 million tons). The blast furnace process is therefore not suitable unless large-scale production is required.

Of iron making processes using iron ore as a starting material, conventionally known processes used when the required output is not so large as the output from blast furnace processes include fluid bed reduction processes, and reduced iron production processes using natural gas. However, all of these processes are for yielding solid iron, and therefore require the step of melting the resulting solid iron. In general, the solid iron is used as a secondary material in an electric furnace or a LD converter, and melted therein.

In order to solve these problems, novel molten iron-manufacturing processes referred to as DIOS (Direct Iron Ore Smelting Reduction Process) or FINEX, in which molten iron is directly produced using iron ore as a starting material, have been developed. In these processes, a mixture that contains a carbon source in an amount required for the reduction of iron oxide is formed using iron oxide, such as iron ore, refined dust, etc., as the main starting material; or a method in which a carbon source is added in an amount required for reduction and heat generation to previously prepared molten iron while blowing pure oxygen gas into the molten iron at a speed equal to or faster than the speed of sound, to thereby combust carbon in the molten iron, and the molten iron is heated by the heat generated by combustion is employed. The reducing reaction of iron oxide is an endothermic reaction; if heat is not supplied from the exterior, the temperature decreases, stopping the reducing reaction and solidifying the molten iron, thus impeding the object of producing molten iron. Therefore, a large amount of carbon must be added to the molten iron to constantly maintain a substantially carbon-saturated condition, and pure oxygen gas is blown into the molten iron to combust a carbon element in the molten iron, so that heat required for the reducing reaction can be constantly supplied, thus maintaining a liquid state.

However, this method has a disadvantage in that considerable amounts of molten iron splashes are scattered out of the system as iron oxide dust, together with an exhaust gas. This dust generation causes considerable loss, such as sensible heat loss from dust, iron yield loss due to dust, expense for recycling the dust, etc. The phenomenon of bursting CO bubbles that are generated by the combustion reaction of carbon in the molten iron and pure oxygen gas is usually called bubble burst; and the dust generated by bubble burst is called bubble burst dust. The bubble burst phenomenon inevitably occurs when carbon in molten iron is combusted by oxygen gas. This is a significant problem to be solved, but solving the problem would be difficult.

An electric arc furnace process is a process in which molten iron is produced by melting scrap iron by using electric arc heating using a graphite electrode. Generally, in the electric arc furnace process, since the content of nitrogen in the obtained molten iron is as high as over 100 ppm, the resulting steel material is hard. Accordingly, this process cannot be used when a low nitrogen content is desired in view of the properties of steel material. Further, the electric arc furnace process has disadvantages in that a great deal of electric power consumption increases costs, the instability of the arc causes heat loss, etc.

To solve these problems, a process for melting cold iron sources has been developed and employed. This process involves adding scrap iron to previously prepared carbon-saturated molten iron, which is referred to as a molten seed, using a conventional LD converter, and blowing pure oxygen gas at supersonic speeds from above while adding pulverized coal from the bottom of the furnace, thereby heating and melting scrap iron using the heat of the combustion reaction of carbon in the molten iron. However, the generation of bubble burst dust cannot be sufficiently inhibited even in the process for melting cold iron sources.

As a means for heating molten iron, electric arc heating using a graphite electrode, which is commonly performed in an electric arc furnace, and a method of combustion using oxygen gas, a carbon element or a silicon element contained in pig iron that is obtained by a blast furnace process are widely used. Examples of heating methods used in the extremely limited processes include, although there is a limitation such that the methods are effective only when a decarbonization reaction is performed in a vacuum degassing apparatus, a method in which CO gas generated by a decarbonization reaction is combusted through the blowing of oxygen gas (RH-KTB process), and a method in which a fuel gas and a combustion-supporting gas are blown into a vacuum chamber (RH-MFB process). Also, there are particular heating methods, such as plasma heating, electric induction heating, etc.; however, they are only used with a molten steel distribution apparatus called a tundish, which is used in the casting step, for the purpose of maintaining the desired temperature when the temperature of molten steel is lower than the target temperature. Thus, they are not used as heating methods for general refining (see, for example, Patent Literatures 1 and 2).

These particular heating methods are used only for small-scale heating, i.e., for heating a target refining vessel, or for raising the temperature of molten steel to the target temperature when the temperature is lower than the target temperature. Accordingly, RH-KTB and RH-MFB methods are used only for small-scale heating in a vacuum degassing step, which is the final step of refining. Thus, since the refinement of molten iron requires a large amount of heat, only very limited means can be used as a method for supplying heat in the refinement of molten iron.

Pig iron obtained by a blast furnace process contains carbon, silicon, phosphorus, manganese, and like exothermic elements that are combusted by oxygen gas, and possesses a large quantity of sensible heat because it has a temperature as high as about 1500° C. These two points are the sources of heat used in converter refining in the blast furnace-LD converter process. Accordingly, the thermal limit of the blast furnace-LD converter process is determined by the amount of the resulting pig iron, the temperature of the pig iron, and the amount of the element (e.g., carbon, silicon, phosphorus, manganese, etc.) that generates heat via the reaction with oxygen gas, the element being contained in the pig iron.

From the viewpoint of heating methods, a currently-employed process for melting cold iron sources, and the aforementioned DIOS and FINEX are an extension of the technical idea of heating used in a blast furnace-LD converter process. Specifically, they are processes for producing molten iron, wherein a carbon source is added into molten iron, and melted to a substantially saturated state; pure oxygen gas is blown into the molten iron to combust the carbon in the molten iron; and scrap iron is melted using the heat generated by combustion, or heat required for the reduction/melting of iron oxide is supplied (for example, see Patent Literature 3). However, as long as the processes are based on this technical idea, the problem of generating bubble burst dust as described above cannot be solved.

The present patent aims to develop a novel means for efficiently supplying a large amount of heat, thus solving the unsolved problems of conventional molten iron manufacturing processes.

CITATION LIST

Patent Literature

[PTL 1] Japanese Unexamined Patent Publication No. H6-73431
[PTL 2] Japanese Unexamined Patent Publication No. H6-73433
[PTL 3] Japanese Unexamined Patent Publication No. H1-283312

SUMMARY OF INVENTION

Technical Problem

The object of the present invention is to provide a process for producing molten iron through the efficient reduction of iron oxide having various chemical compositions and various shapes, or through the efficient melting of scrap iron or reduced iron having various shapes and various chemical compositions, the process being used in cases where a required amount per facility unit (e.g., iron mill or factory) is not so large as in blast furnace processes, or in cases where production is replenished in a facility unit that uses a blast furnace process.

In particular, the object of the present invention is to radically solve problems such as heat loss, iron loss, and loss due to expenses such as dust disposal costs etc., that result from excess generation of iron dust; these problems are not solved by conventional processes in which a required amount of heat is obtained by combusting carbon contained in molten iron with oxygen gas, and to reduce the amount of $CO_2$ gas emitted per ton of steel material. Another object of the present invention is to provide a process for collecting CO gas, hydrogen gas, and/or hydrocarbon gas generated through the heat-decomposition of material such as waste tires, waste plastic, oil sands, etc., that contains a hydrogen or carbon element as a basic chemical component. Still another object of the present invention is to provide a process for controlling the temperature of molten iron.

Solution to Problem

The present inventors conducted extensive research to solve the above object and found that molten iron can be efficiently produced by heating molten iron that serves as a thermal storage material using the heat of a combustion reaction of a gas mixture containing a fuel gas and a combustion-supporting gas, thereby making the molten iron store heat therein. Based on the above findings, the present inventors conducted further research. The present invention was thus accomplished.

That is, the present invention provides the inventions according to the following embodiments.

Item 1.

A process for producing molten iron comprising the steps of:

supplying carbon-containing molten iron to a holding container, heating the molten iron using heat of a combustion reaction of a gas mixture containing a fuel gas and a combustion-supporting gas, thereby storing the heat, and adding a carbon source and an iron-containing material that contains iron oxide and/or scrap iron to the heated and heat-stored molten iron, thereby converting the iron-containing material to molten iron.

Item 2.

The process according to Item 1, wherein, in the step of heating molten iron using the heat of the combustion reaction of a gas mixture containing a fuel gas and a combustion-supporting gas, thereby storing the heat, the temperature of the molten iron is adjusted by controlling a supply amount of the gas mixture containing a fuel gas and a combustion-supporting gas based on the temperature of exhaust gas generated during heating.

Item 3.

The process according to Item 1 or 2, comprising:

mixing a fuel gas and a combustion-supporting gas in a de. Laval nozzle provided at a tip of a metal tube, the outside of the metal tube being water-cooled, to form a gas mixture jet having a speed equal to or faster than the speed of sound at an outlet of the water-cooled metal tube, and blowing the gas mixture jet from an upper portion of the molten iron.

Item 4.

The process according to any one of Items 1 to 3, wherein a float position of exhaust gas bubbles generated by the combustion reaction of the gas mixture containing a fuel gas and a combustion-supporting gas that has been blown into the molten iron is adjusted so that the bubbles are positioned under the iron-containing material that has been added to the molten iron and that is floating on the surface of the molten iron.

Item 5.

The process according to any one of Items 1 to 4, wherein the holding container is a container having a plurality of spaces divided by at least one partition wall, wherein the plurality of spaces are connected to one another below the at least one partition wall.

Item 6.

The process according to any one of Items 1 to 5, wherein the holding container includes at least one hole for introducing the gas mixture containing a fuel gas and a combustion-supporting gas at the bottom and/or a side of the container.

Item 7.

The process according to any one of Items 1 to 6, wherein the holding container includes at least one tap hole for removing molten iron, and at least one discharging hole at the bottom and/or a side of the container for removing slag floating on the molten iron and the holding container includes a tilt mechanism.

Item 8

A process for collecting gas, comprising the steps of:

heating carbon-containing molten iron using heat of a combustion reaction of a gas mixture containing a fuel gas and a combustion-supporting gas, thereby storing the heat, and adding waste tires, waste plastic, and/or an oil sands to the heated and heat-stored molten iron to decompose them, thereby collecting CO gas, hydrogen gas, and/or hydrocarbon gas.

Advantageous Effects of Invention

According to the present invention, a desired amount of molten iron can be efficiently produced through the efficient reduction of iron oxide having various chemical compositions or shapes, or through the efficient melting of scrap iron, even in cases where the amount of iron necessary per furnace is not as large as in blast furnace processes. The present invention fundamentally solves problems such as heat loss, iron loss, and loss due to expenses. such as dust disposal costs etc., that result from a large amount of iron dust generated in conventional processes in which a required amount of heat is obtained by combusting carbon in molten iron by using oxygen gas. The present invention contributes to energy saving, resource saving, improvement in production efficiency, as well as the elimination of $CO_2$ gas generation. Further, according to the present invention, the temperature of carbon-containing molten iron can be adjusted by controlling the supply amount of a gas mixture of a fuel gas and a combustion-supporting gas based on the temperature of generated exhaust gas. Further, in the present invention, CO gas, hydrogen gas, and/or hydrocarbon gas can be collected through the heat-decomposition of material such as waste tires, waste plastic, oil sands, etc., that contains a hydrogen or carbon element as a basic chemical component.

DESCRIPTION OF EMBODIMENTS

Production Process of Molten Iron

Figure 1:
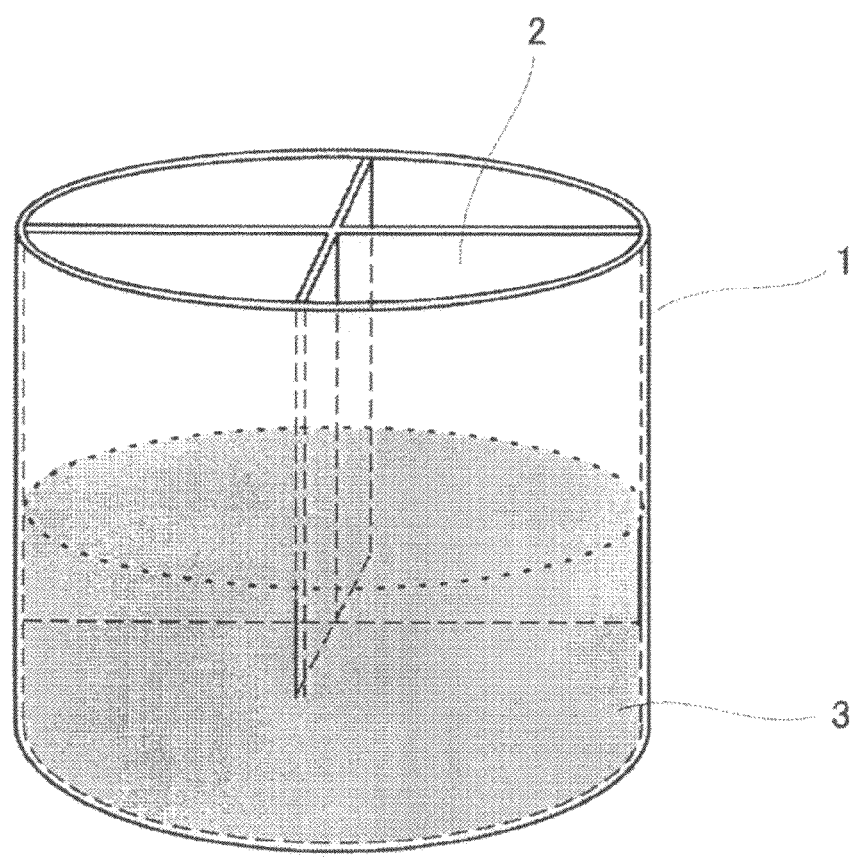
FIG. 1 shows an embodiment of the holding container used in the present invention.

The process for producing the molten iron of the present invention comprises the steps of: supplying carbon-containing molten iron to a holding container (Step 1), heating the molten iron using the heat of a combustion reaction of a gas mixture containing a fuel gas and a combustion-supporting gas, thereby storing the heat therein (Step 2), and adding a carbon source, and an iron-containing material that contains iron oxide and/or scrap iron to the heated and heat-stored molten iron, thereby converting the iron-containing material to molten iron (Step 3).

The steps of the production process of the present invention are explained in detail below.

1. Step 1

In Step 1, carbon-containing molten iron is supplied to a holding container.

The carbon-containing molten iron is used as "a material for storing heat energy", and "a solvent for collecting iron". Here, "a material for storing heat energy" indicates that the molten iron used in the present invention is used as a uniform high capacity heat source when an iron-containing material is converted to molten iron.

Further, since the final product of molten iron is the aggregation of molten iron that is obtained from the iron-containing material and molten iron that is first supplied to the holding container, "a solvent for collecting iron" indicates that the molten iron first supplied to the holding container is used as a solvent for collecting iron obtained from the iron-containing material. Further explanation is provided below.

When scrap iron and reduced iron are melted, or when molten iron is produced by reducing pellets or briquettes in which a reductant mainly comprising a carbon element, a silicon element, and an aluminum element is mixed with iron oxide, molten iron containing a suitable amount of carbon, as detailed below, is prepared beforehand, and an iron source (scrap iron, reduced iron, iron oxide pellets, iron oxide briquettes, etc., as described above) that is to be collected is added to the molten iron. By blowing the gas mixture into the molten iron at a high speed, i.e., a speed that is equal to or faster than the speed of sound as described above, and by adding a carbon element so that the content of carbon in the resulting new molten iron constantly corresponds to a value that is almost equivalent to a suitable amount thereof, the molten iron is vigorously stirred, and thus, the molten iron has highly uniform temperature and carbon content throughout. In this manner, the molten iron melts scrap iron, reduced iron, etc., advances the reducing reaction of iron oxide, and collects the generated iron, while maintaining the same conditions.

The amount of carbon in the molten iron obtained in the process of the present invention depends on the temperature of the molten iron, but it can be 0 to 4.5 wt %, preferably 0 to 4.3 wt %, more preferably 3 to 4.3 wt %, even more preferably 3 to 4 wt %, and most preferably 3.2 to 3.8 wt %.

The iron-carbon phase diagram shows that the melting point of pure iron that contains no carbon is about 1536° C., that the melting point of iron is reduced as the content of carbon in the iron is increased, and that the lowest melting point of iron, which is achieved in a state wherein about 4.3 wt % of carbon is saturated, is 1153° C. In order to use molten iron as a material for storing heat energy, and a solvent for collecting iron, it is necessary to maintain a liquid state by keeping the temperature of molten iron at least at the melting point based on the content of carbon. When the content of carbon is less than the above range, the melting point of molten iron becomes higher, which is likely to increase the amount of heat required for heating molten iron and storing heat for maintaining a liquid state.

In contrast, when the content of carbon exceeds the above range, the melting point becomes lower, which reduces the amount of heat required for heating the molten iron and storing heat for maintaining a liquid state. However, since the activity of carbon in the molten iron is high, $CO_2$ gas and $H_2O$ gas generated by a combustion reaction react with a carbon element in the molten iron to form CO gas and $H_2$ gas, i.e., a so-called carbon solution reaction occurs; this is likely to result in reduced heat efficiency. Accordingly, carbon content exceeding the above range is not preferable. That is, when the content of carbon in the molten iron is too high, $CO_2$ gas and $H_2O$ gas generated by a combustion reaction react with carbon in the molten iron to partially cause an endothermic reaction such as $CO_2+C \rightarrow 2CO_3$ or $H_2O+C \rightarrow CO+H_2$, which is likely to reduce heat efficiency. For this reason, in the present invention, it is preferable to adjust the content of carbon in the molten iron to the aforementioned range.

The amount of molten iron supplied is suitably determined according to the volume of the holding container used, and the amounts of an iron-containing material and a carbon source, which will be added in Step 3 described below; and there are no particular limitations.

The holding container to which molten iron is added is not particularly limited, and furnaces etc., which are generally used in the steel industry can be used. The holding container may include at least one hole for introducing a gas mixture of a fuel gas and a combustion-supporting gas at the bottom and/or a side of the container. A tap hole for removing molten iron and a discharging hole for removing slag floating on the molten iron are preferably provided at the bottom and/or a side of the container.

The holding container can take various shapes such as a vertical cylinder shape, the upper portion of which is narrowed, a horizontal cylinder shape, a basin, etc. However, it is preferable that any shape of the holding container include a tilt mechanism to remove molten iron or refined slag that floats on the molten iron from the molten iron-holding container.

Figure 2:
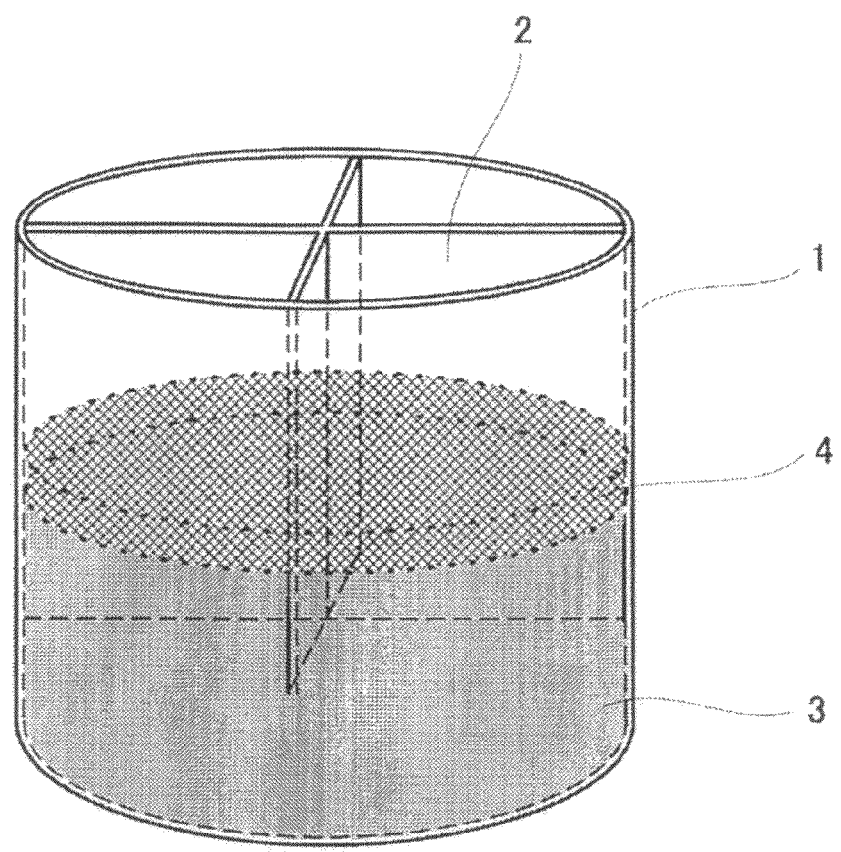
FIG. 2 shows an embodiment of the holding container used in the present invention.
Figure 3:
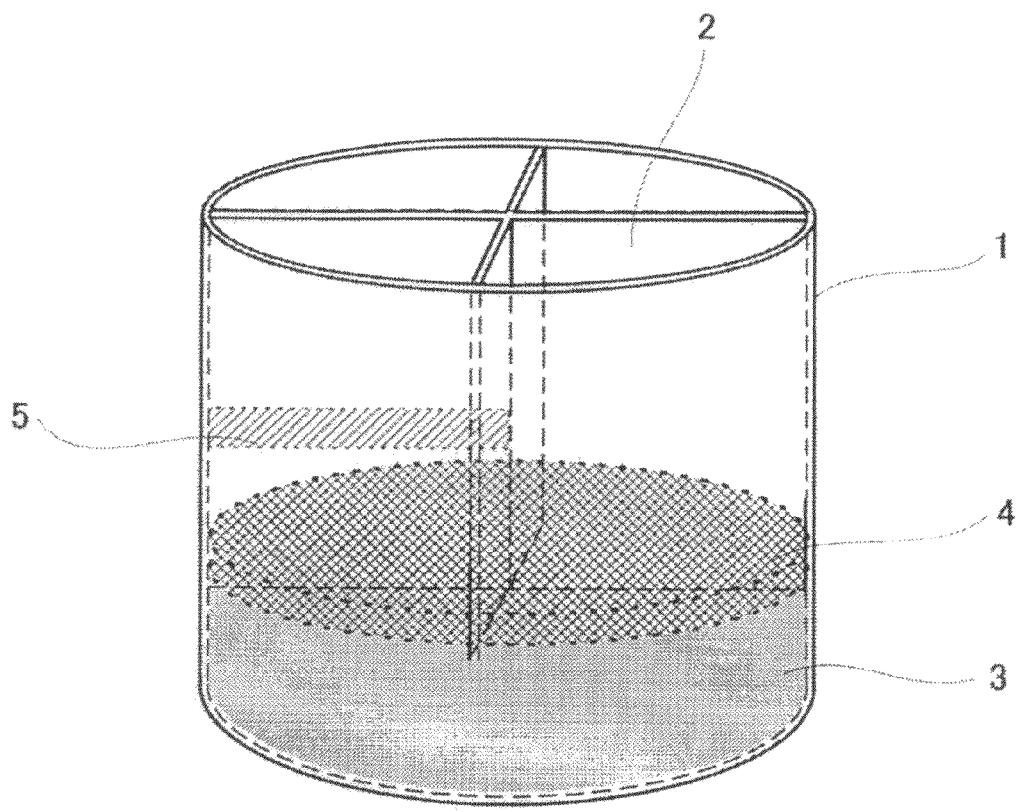
FIG. 3 shows an embodiment of the holding container used in the present invention.

Containers shown in FIGS. 1 to 3 are preferably used as the holding container. Specifically, the inside of the container (1) is divided by at least one partition wall (2) into a plurality of spaces to which an iron-containing material and a carbon source are added, and the spaces are connected to one another below the partition wall. That is, the partition wall (2) is configured in a manner such that the bottom of the partition wall (2) is not in contact with the bottom of the container. Such a container allows the movement of molten iron used as "a material for storing heat energy", and molten iron (3) used as a "solvent for collecting iron" that is obtained from the iron-containing material. In general, as shown in FIG. 2, molten iron is produced by adding an iron-containing material and carbon (4) to the molten iron (3), heating the molten iron using the heat of a combustion reaction of a gas mixture containing a fuel gas and a combustion-supporting gas, and storing the heat therein. However, since iron oxide is highly erosive to refractories, the side of the container (1) and the surface of the partition wall (2) that are in contact with the iron oxide may be eroded. In such a case, as shown in FIG. 3, the surface level of molten iron during normal operation is lowered by releasing part of the molten iron (3) to expose the eroded portion (5); and the eroded portion (5) can be repaired by blowing refractory powders thereto while continuing normal operation in the other spaces.

The basic structure of equipment used in the molten iron production process of the present invention is not particularly limited as long as the equipment comprises the aforementioned holding container, and a device that heats molten iron so that the heat is stored therein using the heat of a combustion reaction of a gas mixture of a fuel gas and a combustion-supporting gas as the main heating means, etc. For example, it is preferable that the equipment include, as necessary, a device that supplies an iron-containing material and a required carbon source, and optionally, waste tires, waste plastic, oil sands, etc., to the holding container, a device that supplies a required sub material, an exhaust gas-collecting device, an exhaust gas thermometer that is provided in the exhaust gas-collecting device at an area that is as near as possible to the molten iron-holding container, a device for removing dust in an exhaust gas, a device for removing sulfur oxides (SOx) and nitrogen oxides (NOx) in an exhaust gas, a device for removing molten iron from the molten iron-holding container, a device for removing refined slag floating on the molten iron from the molten iron-holding container, a device for tilting the molten iron-holding container, etc.

2. Step 2

In Step 2, the molten iron is heated by the heat generated by the combustion reaction of a gas mixture containing a fuel gas and a combustion-supporting gas, and the heat is stored therein. It is desirable that the gas mixture be blown, at a speed equal to or faster than the speed of sound, into molten iron that serves as a heat storage material, and that heat exchange completely cease in the process in which exhaust gas bubbles generated by the combustion reaction rise up to the surface and are isolated from the molten iron.

It is necessary to set the heating temperature of the molten iron in which the heat is stored, higher than the melting point that is determined in accordance with the content of carbon in the molten iron. In general, the temperature is set about 100° C. higher than the melting point for the reason described below. Since the content of carbon in the molten iron during operation is determined by calculation, the molten iron may solidify if the content of carbon in the molten iron is estimated incorrectly, which may cause serious operation difficulties. Also, the temperature for heating the molten iron is set about 100° C. higher than its melting point in consideration of industrial temperature variations. Specifically, when about a 100° C. difference is given, the most economically desirable content of carbon is suitably determined in a molten iron temperature range of 1253° C. to 1636° C. When about a 50° C. degree difference is given, the most economically desirable content of carbon is suitably determined in a molten iron temperature range of 1203° C. to 1586° C.

In the heating and heat storage of the molten iron, the heat of a combustion reaction of a gas mixture containing a fuel gas and a combustion-supporting gas is used as a heating means. Examples of the fuel gas include a gas that burns with a combustion-supporting gas to form $CO_2$ or $H_2O$, such as LNG (liquefied natural gas), LPG (liquefied petroleum gas), CO gas, spray heavy oil, spray gas oil, etc.

Examples of the combustion-supporting gas include pure oxygen, air, etc. The combustion-supporting gas may be determined by comparing the production costs of pure oxygen gas, and the expense associated with the loss of sensible heat released by exhaust gas. That is, if air is used as the combustion-supporting gas, although unlike pure oxygen gas, production expenses are not required, nitrogen, which occupies about 80% of air, releases a large amount of sensible heat as an exhaust gas. Expenditures on energy that are equivalent to this heat loss are required. In general, the use of high-concentration oxygen gas as the combustion-supporting gas provides an energy saving effect.

The fuel gas and the combustion-supporting gas may be mixed at a ratio such that perfect combustion is achieved. Since the perfect combustion ratio varies depending on the kinds of gases used, the ratio can be suitably determined according to the kinds of fuel gas and combustion-supporting gas used. For example, when the fuel gas is LNG and the combustion-supporting gas is pure oxygen gas, the perfect combustion ratio (volume ratio) is such that fuel gas: combustion-supporting gas=1:2.30; and when the fuel gas is LPG and the combustion-supporting gas is pure oxygen gas, fuel gas: combustion-supporting gas is 1:5.12.

As explained above, bubble burst dust increases as the content of carbon that is combusted by oxygen gas increases. Based on this finding, when the fuel gas contained in the gas mixture is in an amount that exceeds that of the fuel gas in the perfect combustion ratio of the gas mixture, the probability that oxygen gas in the gas mixture reacts with carbon in the molten iron may be lowered, which reduces the generation of bubble burst dust to the greatest extent possible.

If iron oxide is the main starting material, an incomplete combustion fuel gas can be efficiently used as a reductant of iron oxide. Similarly, if iron scrap is the main starting material, the generation of bubble burst dust can be reduced to the greatest extent possible by adding a fuel gas in an amount that exceeds that of the perfect combustion ratio, for the same reasons described above. In this case, the incomplete combustion fuel gas is collected as an exhaust gas, and can be recycled.

For the reasons described above, the ratio of the fuel gas and the combustion-supporting gas cannot be easily determined, but, for example, the volume ratio of fuel gas: combustion-supporting gas may be about 1:1 to about 1:10.

In the present invention, molten iron can be heated by the heat of the combustion reaction of the gas mixture, and the heat is stored therein. Additionally, the molten iron can be vigorously stirred by the mechanical energy of hot mixed gas jets.

In order to further enhance the stirring of molten iron, gas, such as oxygen gas, nitrogen gas, air, carbon dioxide, argon gas, and fuel gas can be blown from a side at a position that is lower than the surface of the molten iron, or from the bottom of the molten iron-holding container. However, when the gas blown for vigorous stirring is oxygen gas or air, it is necessary to supply a fuel gas in an amount sufficient for a reaction with the oxygen gas or air, in addition to a fuel gas for forming a gas mixture for generating the heat of a combustion reaction. When the gas blown for vigorous stirring is a fuel gas, it is preferable to add a combustion-supporting gas in an amount sufficient for a reaction with the fuel gas, in addition to a combustion-supporting gas for forming a gas mixture for generating combustion reaction heat.

In the present invention, it is preferable that a fuel gas and a combustion-supporting gas be mixed at a desired ratio in a metal tube whose exterior has been water-cooled, to form a mixed gas jet that has a speed equal to or faster than the speed of sound after passing through the outlet of the water-cooled metal tube, and that the mixed gas jet be blown from the upper portion of the molten iron. It is considered that a gas mixture having a speed equal to or faster than the speed of sound does not form a combustion flame around the outlet of the water-cooled metal tube; however, a combustion reaction occurs in the molten iron or near the surface of molten iron where the speed of the gas mixture decreases, and the temperature of the gas mixture is heated to a combustible temperature, to generate combustion heat.

Top blowing is preferable because the tip of the metal tube (lance) for blowing can be easily replaced when it damages. For example, if a tuyere is located at the bottom or the side of the container, a refractory around the tuyere is likely to be eroded, and is difficult to repair.

The mixed gas jet-releasing outlet of the metal tube is preferably located near the surface of the molten iron, and within such a range that damage of the lance tip caused by molten iron splashes that are generated by the collision energy of the mixed gas jet and the surface of the molten iron is not severe. The aforementioned range is preferable because the mixed gas jet can be blown into the molten iron as deep as possible. A specific value can not be easily determined because it varies depending on the shape, size, etc., of the furnace. However, the outlet may be located at about 0.5 to about 2.5 m, preferably about 1 to about 2 m from the surface of molten iron.

To obtain a gas mixture that has a speed equal to or faster than the speed of sound at the outlet of the nozzle, it is preferable that the metal tube include a de Laval nozzle at the tip, and that the gas mixture be formed in the de Laval nozzle. A production process that is widely known, in which a gas jet has a speed equal to or faster than the speed of sound, is the de Laval nozzle technique, as disclosed, for example, in Japanese Unexamined Patent Publication No. H6-73431 and Japanese Unexamined Patent Publication No. H6-73433. When the gas mixture of a fuel gas and a combustion-supporting gas is blown using the de Laval nozzle, at a gas flow rate equal to or faster than the speed of sound, into a molten iron-holding container in which the temperature is maintained at 1150° C. or more, the gas that reaches near the surface of the molten iron immediately causes a combustion reaction, and enters into the molten iron caused by powerful mechanical energy that the gas possesses.

The temperature of the molten iron is set about 100° C. higher than the melting point that corresponds to the content of carbon in the molten iron. Accordingly, the gas mixture of a fuel gas and a combustion-supporting gas that has entered into the molten iron is in a state such that the gas mixture is sealed in a reaction chamber at a high temperature of approximately 1253° C. or more, which promptly causes a combustion reaction, and results in perfect combustion, even if an unreacted portion remains. The thus formed combustion gas bubbles ($CO_2$ and $H_2O$) float through the molten iron while exchanging heat. In the course of this process, some of the combustion gas bubbles combine with carbon contained in the molten iron to cause an endothermic reaction, and consequently, comprehensive thermal efficiency becomes about 80%. From this point of view, to enhance stirring, it is preferable that the position in which the combustion gas bubbles generated by the combustion reaction of the gas mixture that has been blown into the molten iron float be adjusted to be located under the iron-containing material that has been added to the molten iron and is floating on the surface of the molten iron. The float position may be adjusted according to the position in which the gas mixture of a fuel gas and a combustion-supporting gas is supplied (e.g., supplied from the bottom of the furnace), the blowing pressure, etc.

The holes (preferably 3 to 6) for discharging the gas mixture having a speed equal to or faster than the speed of sound can be provided not only in the vertical direction, but also with a dip angle of not more than 45° with respect to the vertical axis.

In order to use molten iron as a solvent for collecting iron, it is necessary to vigorously stir and mix iron that has undergone a reducing reaction and molten iron used as a solvent. Vigorous stirring and mixing are conducted by blowing a mixed gas jet whose speed has been accelerated to a speed equal to or faster than the speed of sound into the molten iron. Specifically, if the mixed gas jet whose speed has been accelerated to a speed equal to or faster than the speed of sound can be blown into the molten iron, the molten iron that serves as a heat storage substance can be heated and the heat is stored therein; and the molten iron, and solid iron that has undergone a reducing reaction and is floating on the molten iron can be vigorously stirred by the collision energy of the mixed gas jet whose speed has been accelerated to a speed equal to or faster than the speed of sound, and by the buoyancy of $CO_2$ or $H_2O$ bubbles generated by the combustion reaction. Thus, the solid iron can be promptly collected in the molten iron.

The supply amount of the gas mixture of a fuel gas and a combustion-supporting gas can be suitably determined according to the heating temperature, the amount of molten iron supplied, the kind and the amount of iron-containing material used, etc., and there are no particular limitations.

In the present invention, it is preferable to keep the temperature of the molten iron constant by adjusting the supply amount of the gas mixture of a fuel gas and a combustion-supporting gas by measuring the temperature of combustion exhaust gas in which heat exchange with the molten iron is completed. The temperature of the molten iron is as described above. It is believed that the temperature of the exhaust gas becomes almost the same as the temperature of molten iron if the heat exchange of the combustion gas bubbles is perfectly performed. However, since the measuring point of the exhaust gas temperature is separated from the surface of the molten iron, the temperature of the exhaust gas is generally lower than the temperature of the molten iron.

When the heat exchange of combustion gas bubbles and molten iron is not fully performed, a high-temperature combustion gas is discharged together with the exhaust gas, which increases the temperature of the exhaust gas. Therefore, considering such a change in temperature, the target temperature of the exhaust gas is set about 10° C. to 100° C., and preferably about 10° C. to 50° C. higher than the target temperature of the molten iron; however, this varies depending on the kind of furnace used, the amount of iron-containing material used, and the blowing conditions of the gas mixture, etc.

If the temperature of the exhaust gas falls below the target temperature of the exhaust gas, in order to improve production efficiency, the gas is preferably supplied in an amount that is up to the maximum removal capacity of the exhaust gas, or the maximum capacity of equipment for supplying the gas mixture of a fuel gas and a combustion-supporting gas. The supply of gas is stopped when the temperature of the exhaust gas reaches the target temperature. Thus, the temperature of molten iron can be kept constant by adjusting the supply amount of the gas mixture of a fuel gas and a combustion-supporting gas based on the temperature of the exhaust gas.

3. Step 3

In Step 3, the iron-containing material and the carbon source are added to the heated and heat-stored molten iron, thereby converting the iron-containing material to molten iron.

Examples of the iron-containing material include iron oxide having various kinds of chemical compositions and various shapes (e.g., iron ore), and material that contains iron, such as scrap iron, reduced iron, etc.

Examples of the shape of iron oxide include lumps, powders, briquettes and pellets in which powders are compressed, etc. The purity of iron oxide varies depending on its source, and there are various kinds. In the present invention, any iron oxide can be efficiently reduced to collect iron. The same applies to scrap iron; the object of the present invention is to produce molten iron by efficiently melting scrap iron regardless of its shape or size. Therefore, the present invention ensures the selection of a suitable starting material in accordance with market prices, and provides an economically reasonable process for producing molten iron regardless of the kind of main starting material.

The carbon source is used as a reductant of iron oxide, or for the purpose of adjusting the content of carbon in the obtained molten iron. Examples thereof include cokes, graphites, coals, etc.

If iron oxide such as iron ore is used as an iron-containing material, the iron oxide is efficiently reduced by the carbon source to molten iron in the holding container. The resulting iron melts into the molten iron that is present in the holding container. It is known that a reducing reaction is relatively promptly proceeded by heating to 1000° C. or more in the presence of both iron oxide and carbon; however, in the present invention, molten iron is heated to 1000° C. or more, and it stores heat from the heat of the combustion reaction of a gas mixture of a fuel gas and a combustion-supporting gas, and iron oxide is efficiently reduced in a uniform manner at each position in the furnace by the heat stored in the molten iron.

The use of iron ore as an iron-containing material tends to relatively increase the amount of phosphorus in the resulting molten iron. Therefore, if molten iron with low phosphorus content is desired, phosphorus can be removed by adding lime. The amount of lime added is not particularly limited, and suitably determined so that the desired amount of phosphorus can be obtained.

Theoretically, the content of carbon added can be determined by determining the melting point of the iron, but the use efficiency of carbon varies depending on the shape and chemical composition of iron oxide, and splash conditions related to the blowing conditions of the gas mixture for heating. Therefore, the content of carbon cannot simply be theoretically determined, but, for example, the weight ratio of iron oxide: carbon source is preferably about 1:0.1 to 1, more preferably about 1:0.1 to 0.5, and even more preferably about 1:0.28 to 0.33.

In the present invention, a carbon source is mainly used as a reductant of iron oxide; however, as explained above, by adding a fuel gas in an amount that exceeds that of a combustion-supporting gas, the fuel gas can be used as a reductant of iron oxide. The reductant used in the present invention is selected depending on market prices, and this is the basic concept of the present patent.

The weight ratio of the originally present molten iron and iron oxide added is not particularly limited because the required heat energy is supplied by the heat of the combustion reaction of the gas mixture. However, in consideration of the reducing reaction rate of iron oxide, it is preferable that the weight ratio of molten iron: iron oxide be about 1:0.1 to 3 (preferably 1:0.1 to 0.5).

Further, if scrap iron such as steel scrap etc., is used as the iron-containing material, the scrap iron is efficiently melted in the holding container to molten iron. In this case, it is necessary to adjust the supply amount of a carbon source so that the carbon content corresponds to the carbon content of the molten iron that is originally present in the holding container.

The supply amount of the carbon source in this case depends on the required amount of carbon in the molten iron. As described above, the carbon content of the molten iron is preferably 4.3 wt % or less, more preferably 3 to 4.3 wt %, even more preferably 3 to 4 wt %, and most preferably 3.2 to 3.8 wt %. The supply amount of the carbon source can be determined so that the carbon content is in the above range. For example, when molten iron that contains carbon in an amount about 4 wt % is produced using 55 t of scrap iron, 2.2 t of the carbon source is needed. About 2.4 to 2.6 t of the carbon source is preferred in consideration of industrial loss etc.

The method of adding a carbon source is not particularly limited. A carbon source may be supplied from a side at a position lower than the surface of the molten iron, or the bottom of the holding container, and a carbon source may be blown from the upper portion of the molten iron. Also, when using a fuel gas for forming a gas mixture as a carrier gas, a fine powder carbon source may be mixed with it and supplied.

The weight ratio of the originally present molten iron and scrap iron added is not particularly limited, but the amount of scrap iron added each time is about 60 wt % or less of molten iron, preferably 55% or less of molten iron. When over 60 wt % of molten iron is added, the temperature of the molten iron excessively falls, which may cause solidification.

Gas Collecting Process

The present invention relates to a process for collecting gas comprising the steps of: heating carbon-containing molten iron using the heat of a combustion reaction of a gas mixture of a fuel gas and a combustion-supporting gas; and adding waste tires, waste plastic, and/or oil sands to the heated and heat-stored molten iron to heat-decompose them, thereby collecting CO gas, hydrogen gas, and/or hydrocarbon gas.

In the production process of the present invention, an exhaust gas-collecting device that also serves as a dust collector is included since a large amount of CO gas is generated, particularly when iron oxide is used as the main starting material. Using this device, it is possible to collect CO gas, hydrogen gas, or hydrocarbon gas generated through heat decomposition by adding a material such as waste tires, waste plastic, and/or oil sands that contains a carbon element or a hydrogen element as a basic chemical component, to the molten iron.

The supply amount of a material such as waste tires, waste plastic and/or oil sands that contains a carbon element or a hydrogen element as a basic chemical component depends on exhaust gas removal capacity. Therefore, as long as generated exhaust gas can be removed, the supply amount of the material is not particularly limited.

As for the steps and equipment for heating using the heat of the combustion reaction of the gas mixture, any steps and equipment disclosed in the present invention can be used.

Process for Controlling the Temperature of Molten Iron

Further, the present invention relates to a process for controlling the temperature of carbon-containing molten iron, wherein, in the step in which the molten iron is heated by the heat of a combustion reaction of a gas mixture containing a fuel gas and a combustion-supporting gas, the amount of the gas mixture containing a fuel gas and a combustion-supporting gas added is adjusted based on the temperature of the exhaust gas generated during heating.

As for the steps for heating using the heat of the combustion reaction of the gas mixture, the process for adjusting the supply amount of the gas mixture of a fuel gas and a combustion-supporting gas based on the temperature of an exhaust gas generated during heating, etc., any processes disclosed in the present invention can be used.

EXAMPLES

The present invention will be described in more detail below by way of examples; however, the scope of the invention is not limited by these examples.

Example 1

A thermometer is positioned at the lower portion of an exhaust gas-collecting device that is located at the upper portion of the mouth of a LD converter that is capable of treating 230 t of molten steel. The temperature of the gas to be discharged from the LD converter can be measured using the aforementioned thermometer. 100 t of molten iron was fed into the LD converter.

A gas mixture containing a fuel gas and a combustion-supporting gas for heating molten iron was blown from the upper portion of the molten iron through a water-cooled lance provided with a gas blowing channel including a de Laval nozzle at the tip. LPG and highly pure oxygen gas were used as a fuel gas and a combustion-supporting gas, respectively, and the ratio of the gases (volume ratio) was determined as LPG: pure oxygen gas=1:5.12.

The size of the de Laval nozzle on the upstream side of the end point of the initial expansion region was determined under conditions for supplying pure oxygen gas that is required in large quantities; and the size of the de Laval nozzle on the downstream side of the starting point of the set-off region located on the downstream side of the throat region was determined under conditions for suitably expanding a gas mixture. The initial expansion region and the set-off region were connected by a straight line. In this area, slit apertures were circumferentially arranged on the tube wall of the de Laval nozzle. The de Laval nozzle was designed so that a desired amount of LPG would be supplied through the slit apertures, and mixed with pure oxygen gas in the de Laval nozzle. At the outlet of the lance, the speed of the gas mixture of LPG and pure oxygen gas reaches a speed equal to or faster than the speed of sound, and the mixture is blown into the molten iron.

This de Laval nozzle is capable of supplying LPG at a rate of about 11,000 $Nm^3$/hour, pure oxygen gas at a rate of about 56,300 $Nm^3$/hour, and a gas mixture of LPG and pure oxygen gas at a rate of about 67,300 $Nm^3$/hour.

Since the content of carbon in the molten iron, and the temperature of the molten iron were adjusted to about 4% and about 1400° C., respectively, the gas mixture of LPG and pure oxygen gas entered into the molten iron while promptly causing a combustion reaction near the surface of the molten iron, and generating hot flame. This molten iron heating system confirmed that an increase in the amount of the gas mixture of LPG and pure oxygen gas supplied raises the temperature of the exhaust gas, and that there is a proportional increase in the temperature of the molten iron with the increase in the temperature of the exhaust gas.

Example 2

In the example, molten iron was produced using the same equipment as in Example 1, and using iron ore as the main starting material. In this case, LPG was used as a fuel gas, and pure oxygen gas was used as a combustion-supporting gas.

About 100 t of molten iron in which the content of carbon and the temperature of the molten iron were adjusted to about 4% and about 1400° C., respectively, was prepared in the LD converter beforehand. About 203 t of briquettes was prepared in which approximately 41 t of pulverized coal, and approximately 162 t of iron ore that contains iron in an amount of about 63% were mixed and solidified.

The amount of the briquettes added each time was limited to about 60% of the weight of the molten iron, and estimated by dividing the weight of the molten iron by 2.47, which is the cooling capacity coefficient of briquettes to scrap iron. The amount of scrap iron added was limited to 55% of the weight of the molten iron. However, since the briquettes have a lower density than the molten iron, and therefore they float on the surface of the molten iron, and not all of the briquettes added immediately cool the molten iron, the amount of briquettes added may be determined by considering the above as the upper limit. The cooling capacity coefficient of briquettes to scrap iron being 2.47 indicates that the briquettes have a 2.47 times higher cooling capacity than the same weight of scrap iron.

First, the distance between the tip of the water-cooled lance and the surface of the molten iron was set at 1.5 m. LPG, pure oxygen gas, and the gas mixture of LPG and pure oxygen gas were supplied at a rate of about 11,000 Nm$^3$/hour, about 56,300 Nm$^3$/hour, and about 67,300 Nm$^3$/hour, respectively. Immediately after the supply was commenced, the briquettes were fed into the furnace from the raw material bunker that was located above the furnace. At the same time the supply of the briquettes commenced, the blowing of pulverized coal from the bottom of the furnace was initiated. The blowing of the pulverized coal was conducted at a rate such that about 27 kg of pulverized coal per ton of briquettes was blown.

At the beginning, the briquettes were fed at a supply rate of 3 t/min. The supply rate of the briquettes was adjusted so that the temperature of the exhaust gas could be kept at around 1400° C. When the temperature of the exhaust gas exceeds 1500° C., the reducing reaction stops, which indicates that molten iron is heated. Accordingly, it is preferable that the supply amount of briquettes be adjusted so that the temperature of the exhaust gas does not exceed 1450° C.

After adding all of the thus prepared 203 t of briquettes, the supply of the gas mixture from the water-cooled lance, and the supply of the pulverized coal from the bottom of the furnace were stopped when the temperature of the exhaust gas reached 1500° C. or more. Promptly thereafter, the water-cooled lance was removed from the furnace.

About 100 t of molten iron was left in the furnace, and about 100 t of molten iron was tapped to a ladle. Subsequently, slag floating on the surface of the molten iron was discharged to a slag pan, and the next operation was started. During the operation, about 1 t of molten iron was tapped from the furnace. About 0.8 t of molten iron was tapped together with the discharged slag. The amount of dust generated during this operation was relatively small, i.e., 0.2 t. The content of pulverized coal blown from the bottom of the furnace used in this operation was about 5.4 t; the contents of LPG, and pure oxygen gas were about 10,755 Nm$^3$, and about 55,470 Nm$^3$, respectively; and the required time was about 60 minutes. The content of gas collected by the exhaust gas-collecting device was 133,900 Nm$^3$; and CO gas, H$_2$ gas, and CO$_2$ gas in the exhaust gas were about 70%, about 10%, and about 20%, respectively. This operation was repeated twice, and about 200 t of molten iron was obtained. The molten iron was subjected to a desulfurization treatment, and then general converter refining, thus yielding molten steel.

If the above operation pattern is standardized, measurement of the exhaust gas temperature is not required. If the supply rate of briquettes, and the blowing rate of pulverized coal from the bottom of the furnace are adjusted according to a standard operation, and operation is conducted in consideration of the total content of the gas mixture, almost the same results can be achieved.

Example 3

In the example, molten iron was produced using the same equipment as in Example 1, and using iron ore as the main starting material. In this case, LPG was used as a fuel gas, and pure oxygen gas was used as a combustion-supporting gas.

About 100 t of molten iron in which the content of carbon and the temperature of the molten iron were adjusted to about 4% and about 1400° C., respectively, was prepared in the LD converter beforehand. Approximately 162 t of lump of iron ore containing iron in an amount of about 63% was prepared.

The amount of the iron ore added each time was limited to about 60% of the weight of the molten iron, and estimated by dividing the weight of the molten iron by 3.1, which is the cooling capacity coefficient of iron ore to scrap iron. The amount of scrap iron added was limited to 55% of the weight of the molten iron; however, since the iron ore has a lower density than the molten iron and therefore it floats on the surface of the molten iron, and not all of iron ore added immediately cool the molten iron, the amount of iron ore added may be determined by considering the above as the upper limit. The cooling capacity coefficient of iron ore to scrap iron being 3.1 indicates that the iron ore has a 3.1 times higher cooling capacity than the same weight of scrap iron.

First, the distance between the tip of the water-cooled lance and the surface of the molten iron was set at 1.5 m. LPG, pure oxygen gas, and the gas mixture of LPG and pure oxygen gas were supplied at a rate of about 11,000 Nm$^3$/hour, about 56,300 Nm$^3$/hour, and about 67,300 Nm$^3$/hour, respectively. Immediately after the supply was commenced, the iron ore was fed into the furnace from the raw material bunker that was located above the furnace. At the same time the supply of the iron ore commenced, the blowing of pulverized coal from the bottom of the furnace was initiated. The blowing of the pulverized coal was conducted at a rate such that about 454 kg of pulverized coal per ton of iron ore was blown.

At the beginning, the iron ore was fed at a supply rate of 2.3 t/min. The supply rate of the iron ore'was adjusted so that the temperature of the exhaust gas could be kept at around 1400° C. When the temperature of the exhaust gas exceeds 1500° C., the reducing reaction stops, which indicates that molten iron is heated. Accordingly, it is preferable that the supply amount of briquettes be adjusted so that the temperature of the exhaust gas does not exceed 1450° C.

After adding all of the thus prepared 162 t of iron ore, the supply of the gas mixture from the water-cooled lance, and the supply of the pulverized coal from the bottom of the furnace were stopped when the temperature of the exhaust gas reached 1500° C. or more. Promptly thereafter, the water-cooled lance was removed from the furnace.

About 100 t of molten iron was left in the furnace, and about 100 t of molten iron was tapped to a ladle. Subsequently, slag floating on the surface of the molten iron was discharged to a slag pan, and the next operation was started. During the operation, about 1 t of molten iron was tapped from the furnace. About 0.8 t of molten iron was tapped together with the discharged slag. The amount of dust generated during this operation was relatively small, i.e., 0.2 t. The content of pulverized coal blown from the bottom of the furnace used in this operation was about 46.4 t; the contents of LPG, and pure oxygen gas were about 10,755 Nm$^3$, and about 55,470 Nm$^3$, respectively; and the required time was about 60 minutes.

The content of gas collected by the exhaust gas-collecting device was 133,900 Nm$^3$; and CO gas, H$_2$ gas, and CO$_2$ gas in the exhaust gas were about 70%, about 10%, and about 20%, respectively. This operation was repeated twice, and about 200 t of molten iron was obtained. The molten iron was subjected to a desulfurization treatment, and then general converter refining, thus yielding molten steel.

Example 4

In the example, the furnace equipment used in Example 1 was used, and LNG and pure oxygen gas were used as a fuel gas and a combustion-supporting gas, respectively. Specifically, LNG was used as a fuel gas, and highly pure oxygen gas was used as a combustion-supporting gas. The ratio of the gases (volume ratio) was determined as LNG: pure oxygen gas=1:2.3.

The water-cooled lance used in this example has a double layered structure; the outside is a flow path for pure oxygen gas, and the inside thereof is a copper tube type flow path for LNG. A desired amount of LNG was supplied to a region called a "stagnation region", which is a portion in which the tube wall at the upstream side of the throat region starts to narrow toward the throat region. Thus, the de Laval nozzle was designed so that LNG and pure oxygen gas would be mixed in the de Laval nozzle. At the outlet of the lance, the speed of the gas mixture of LNG and pure oxygen gas reaches a speed equal to or faster than the speed of sound, and the mixture is blown into the molten iron.

This de Laval nozzle is capable of supplying LNG, pure oxygen gas, and the gas mixture of LNG and pure oxygen gas at a rate of about 18,300 Nm$^3$/hour, about 42,100 Nm$^3$/hour, and about 60,400 Nm$^3$/hour, respectively.

Since the content of carbon in the molten iron, and the temperature of the molten iron were adjusted to about 4% and about 1400° C., respectively, the gas mixture of LNG and pure oxygen gas entered into the molten iron while promptly causing combustion near the surface of the molten iron, and generating hot flame. This molten iron heating system confirmed that an increase in the amount of the gas mixture of LNG and pure oxygen gas supplied raises the temperature of the exhaust gas, and that there is a proportional increase in the temperature of the molten iron with the increase in the temperature of the exhaust gas.

Example 5

In the example, molten iron was produced using the same equipment as in Example 4, and scrap iron as the main starting material. In this case, LNG was used as a fuel gas, and pure oxygen gas was used as a combustion-supporting gas.

About 100 t of molten iron in which the content of carbon and the temperature of the molten iron were adjusted to about 4% and about 1400° C., respectively, was prepared in the LD converter beforehand. About 110 t of scrap iron was also prepared. First, about 50 t of the scrap iron (the weight ratio of the scrap iron to the molten iron being about 50%) was added to the molten iron. After the completion of the supply of the scrap iron, the distance between the tip of the water-cooled lance and the surface of the molten iron was set at about 1.5 m. Immediately thereafter, LNG, pure oxygen gas, and the gas mixture of LNG and pure oxygen gas were supplied at a rate of about 18,300 Nm$^3$/hour, about 39,470 Nm$^3$/hour, and about 57,770 Nm$^3$/hour, respectively. Immediately after the supply of the gas mixture commenced, pulverized coal was blown from the tuyeres for pulverized coal, which is located at the bottom of the furnace. The pulverized coal blowing rate was 306 kg/min.

About 9.4 minutes later, the temperature of the exhaust gas exceeded 1500° C. Therefore, the blowing of the pulverized coal from the bottom of the furnace, and the blowing of the gas mixture were stopped, and 60 t of the scrap iron was additionally introduced. The amount of the gas mixture, and the blowing content of the pulverized coal at this stage were about 9,012 Nm$^3$ and 2877 kg, respectively.

Immediately after the completion of the additional introduction of 60 t of the scrap iron, the water-cooled lance was inserted into the furnace, and operation commenced under the exact same conditions as above. About 11.2 later, the temperature of the exhaust gas exceeded 1500° C.; therefore, the blowing of the gas mixture and the blowing of pulverized coal from the bottom of the furnace were stopped.

About 100 t of molten iron was left in the furnace, and about 107 t of molten iron was tapped to a ladle. About 1 t of molten iron was scattered out of the furnace during refinement, about 0.8 t of molten iron was tapped together with slag, and about 0.5 t was dust. About 110 t of scrap iron was melted by a total of about 21 minutes of gas mixture jetting. During this operation, about 6100 Nm$^3$ of LNG, about 13,730 Nm$^3$ of pure oxygen gas, and about 6300 kg of pulverized coal blown from the bottom of the furnace were consumed. About 11,700 Nm$^3$ of exhaust gas was collected by the exhaust gas-collecting device. CO gas, H$_2$ gas, and CO$_2$ gas in the exhaust gas were about 70%, about 10%, and about 20%, respectively.

The thus obtained molten iron had a carbon content of about 4%, and a temperature of about 1400° C., which was almost the same as the original molten iron.

This operation was repeated twice, and about 214 t of molten iron was obtained. The molten iron was then subjected to a desulfurization treatment, and then general converter refining, thus yielding molten steel.

Example 6

In the example, the furnace equipment used in Example 1 was used, and LNG and pure oxygen gas were used as a fuel gas and a combustion-supporting gas, respectively. Specifically, LNG was used as a fuel gas, and highly pure oxygen gas was used as a combustion-supporting gas. The ratio of the gases (volume ratio) was determined as LNG: pure oxygen gas=1:2.3.

The water-cooled lance used in this example has a double layered structure; the outside is a flow path for pure oxygen gas, and the inside thereof is a copper tube type flow path for LNG. In the de Laval nozzle, the sectional area of the throat region was determined in accordance with the flow rate of the pure oxygen gas that was consumed in large quantities. A desired amount of LNG was supplied to the pure oxygen gas stream at the throat region of the de Laval nozzle. The de Laval nozzle was designed so that the gas mixture would suitably expand at the downstream side of the throat region, and the LNG and pure oxygen gas would be uniformly mixed in the de Laval nozzle, thus exhibiting a high speed that is equal to or faster than the speed of sound at the outlet of the nozzle.

This de Laval nozzle is capable of supplying LNG, pure oxygen gas, and the gaseous mixture of LNG and pure oxygen gas at a rate of about 18,300 Nm$^3$/hour, about 42,100 Nm$^3$/hour, and about 60,400 Nm$^3$/hour, respectively.

Since the content of carbon in the molten iron, and the temperature of the molten iron were adjusted to about 4% and about 1400° C., respectively, the gas mixture of LNG and pure oxygen gas entered into the molten iron while promptly causing combustion near the surface of molten iron, and generating hot flame. This molten iron heating system confirmed that an increase in the amount of the gas mixture of LNG and pure oxygen gas supplied raises the temperature of the exhaust gas, and that there is a proportional increase in the temperature of the molten iron with the increase in the temperature of the exhaust gas.

Example 7

In the example, molten iron was produced using the same equipment as in Example 6, and scrap iron as the main starting material. In this case, LNG was used as a fuel gas, and pure oxygen gas was used as a combustion-supporting gas.

About 100 t of molten iron in which the content of carbon and the temperature of the molten iron were adjusted to about 4% and about 1400° C., respectively, was prepared in the LD converter beforehand. About 110 t of scrap iron was also prepared. First, about 50 t of the scrap iron (the weight ratio of the scrap iron to the molten iron being about 50%) was added to the molten iron. After the completion of the supply of the scrap iron, the distance between the tip of the water-cooled lance and the surface of the molten iron was set at about 1.5 m. Immediately thereafter, LNG, pure oxygen gas, and the gas mixture of LNG and pure oxygen gas were supplied at a rate of about 18,300 $Nm^3$/hour, about 39,470 $Nm^3$/hour, and about 57,770 $Nm^3$/hour, respectively. Immediately after the supply of the gas mixture commenced, pulverized coal was blown from the tuyeres for pulverized coal, which is located at the bottom of the furnace. The pulverized coal blowing rate was 306 kg/min.

About 9.4 minutes later, the temperature of the exhaust gas exceeded 1500° C. Therefore, the blowing of the pulverized coal from the bottom of the furnace, and the blowing of the gas mixture were stopped, and 60 t of the scrap iron was additionally introduced. The amount of the gas mixture, and the blowing content of the pulverized coal at this stage were about 9,012 $Nm^3$ and 2877 kg, respectively.

Immediately after the completion of the additional introduction of 60 t of the scrap iron, the water-cooled lance was inserted into the furnace, and operation commenced under the exact same conditions as above. About 11.2 minutes later, the temperature of the exhaust gas exceeded 1500° C.; therefore, the blowing of the gas mixture and the blowing of pulverized coal from the bottom of the furnace were stopped. About 100 t of molten iron was left in the furnace, and about 107 t of molten iron was tapped to a ladle. About 1 t of molten iron was scattered out of the furnace during refinement, about 0.8 t of molten iron was tapped together with the discharged slag, and about 0.5 t was dust.

About 110 t of scrap iron was melted by a total of about 21 minutes of gas mixture jetting. During this operation, about 6100 $Nm^3$ of LNG, about 13,730 $Nm^3$ of pure oxygen gas, and about 6300 kg of pulverized coal blown from the bottom of the furnace were consumed. About 11,700 $Nm^3$ of exhaust gas was collected by the exhaust gas-collecting device. CO gas, $H_2$ gas, and $CO_2$ gas in the exhaust gas were about 70%, about 10%, and about 20%, respectively.

The thus obtained molten iron had a carbon content of about 4%, and a temperature of about 1400° C., which was almost the same as the original molten iron.

This operation was repeated twice, and about 214 t of molten iron was obtained. The molten iron was then subjected to a desulfurization treatment, and then general converter refining, thus yielding molten steel.

Example 8

An example of a gas-collecting operation based on the operation of Example 7 is shown.

A total of 10 t of waste tires was added in twice, while conducting the operation of Example 7. The increment of gas collected in this stage was about 7,600 $Nm^3$, and the increment of SOx in the gas collected in this stage was about 120 ppm. The content of sulfur in the molten iron increased by 0.04%, and the content of molten iron increased by about 1.2 t. This is because iron in the waste tires was collected. The other results of the operation were not so different from those of Example 7. This revealed that the waste tires were gasified, and collected as a fuel gas.

Comparative Example 1

In the equipment of Example 1, the water-cooled lance provided with a gas-blowing channel that includes a de Laval nozzle at the tip was replaced with a conventionally used lance that drains only pure oxygen gas. The lance is capable of jetting pure oxygen gas at a supply rate of 52,500 $Nm^3$/hour, i.e., a gas jetting speed of Mach 2.

About 100 t of molten iron in which the content of carbon and the temperature of the molten iron were adjusted to about 4% and about 1400° C., respectively, was prepared in the LD converter beforehand. About 110 t of scrap iron was also prepared.

First, about 50 t of the scrap iron (the weight ratio of the scrap iron to the molten iron being about 50%) was supplied to the molten iron. After the completion of the supply of the scrap iron, the distance between the tip of the water-cooled lance and the surface of the molten iron was set at about 2.0 m. Immediately thereafter, the pure oxygen gas was blown at a supply rate of 52,500 $Nm^3$/hour, and pulverized coal was blown from the bottom of the furnace at a rate of 1015 kg/min. About 9 minutes later, the scrap iron first supplied melted; accordingly, the blowing of the pulverized coal from the bottom of the furnace, and the blowing of the pure oxygen gas were stopped.

Subsequently, the other 60 t of the scrap iron was supplied, and the operation was restarted under the same conditions as above. About 11 minutes later, the additionally supplied scrap iron melted; therefore, the blowing of the pulverized coal from the bottom of the furnace, and the blowing of the pure oxygen gas were stopped. The thus obtained molten iron had almost the same conditions as the initial conditions, i.e., a carbon content of about 4% and a temperature of about 1400° C.

About 100 t of molten iron was left in the furnace, and about 98 t of molten iron was tapped to a ladle. In this operation, approximately 10.1 t of dust was generated, and about 1 t of molten iron was scattered out of the furnace. About 0.8 t of molten iron was tapped together with the discharged slag. The content of the gas collected by the exhaust gas-collecting device was 35,920 $Nm^3$.

Examples 5 and 7, and Comparative Example 1 show the advantages of the process of heating molten iron using the heat of a combustion reaction of a gas mixture containing a fuel gas and a combustion-supporting gas.

[Explanation of Numerals]

1. Container
2. Partition wall
3. Molten iron

4. Iron-containing material
5. Eroded portion

The invention claimed is:

1. A process for producing molten iron comprising the steps of:
   (1) supplying carbon-containing molten iron to a holding container,
   (2) heating the molten iron using heat of a combustion reaction of a gas mixture containing a fuel gas and a combustion-supporting gas, thereby storing the heat, wherein the fuel gas contained in the gas mixture is in an amount that exceeds that of the fuel gas in the perfect combustion ratio of the gas mixture, and
   (3) adding a carbon source and an iron-containing material that contains iron oxide and/or scrap iron to the heated and heat-stored molten iron, thereby converting the iron-containing material to molten iron, wherein the amount of carbon in the molten iron obtained is 3 to 4.5 wt %.

2. The process according to claim 1, wherein, in the step of heating molten iron using the heat of the combustion reaction of a gas mixture containing a fuel gas and a combustion-supporting gas, thereby storing the heat,
   the temperature of the molten iron is adjusted by controlling a supply amount of the gas mixture containing a fuel gas and a combustion-supporting gas based on the temperature of exhaust gas generated during heating.

3. The process according to claim 1, comprising:
   mixing a fuel gas and a combustion-supporting gas in a de Laval nozzle provided at a tip of a metal tube, the outside of the metal tube being water-cooled, to form a gas mixture jet having a speed equal to or faster than the speed of sound at an outlet of the water-cooled metal tube, and
   blowing the gas mixture jet from an upper portion of the molten iron.

4. The process according to claim 1, wherein a float position of exhaust gas bubbles generated by the combustion reaction of the gas mixture containing a fuel gas and a combustion-supporting gas that has been blown into the molten iron is adjusted so that the bubbles are positioned under the iron-containing material that has been added to the molten iron and that is floating on the surface of the molten iron.

5. The process according to claim 2, comprising:
   mixing a fuel gas and a combustion-supporting gas in a de Laval nozzle provided at a tip of a metal tube, the outside of the metal tube being water-cooled, to form a gas mixture jet having a speed equal to or faster than the speed of sound at an outlet of the water-cooled metal tube, and
   blowing the gas mixture jet from an upper portion of the molten iron.

6. The process according to claim 2, wherein a float position of exhaust gas bubbles generated by the combustion reaction of the gas mixture containing a fuel gas and a combustion-supporting gas that has been blown into the molten iron is adjusted so that the bubbles are positioned under the iron-containing material that has been added to the molten iron and that is floating on the surface of the molten iron.

7. The process according to claim 3, wherein a float position of exhaust gas bubbles generated by the combustion reaction of the gas mixture containing a fuel gas and a combustion-supporting gas that has been blown into the molten iron is adjusted so that the bubbles are positioned under the iron-containing material that has been added to the molten iron and that is floating on the surface of the molten iron.

8. The process according to claim 5, wherein a float position of exhaust gas bubbles generated by the combustion reaction of the gas mixture containing a fuel gas and a combustion-supporting gas that has been blown into the molten iron is adjusted so that the bubbles are positioned under the iron-containing material that has been added to the molten iron and that is floating on the surface of the molten iron.

\* \* \* \* \*